(12) United States Patent
Zou

(10) Patent No.: US 10,705,642 B2
(45) Date of Patent: Jul. 7, 2020

(54) FORCE TOUCH DISPLAY DEVICE AND METHOD FOR MANUFACTURING AND DRIVING THE SAME

(71) Applicant: BOE TECHNOLOGY GROUP CO., LTD., Beijing (CN)

(72) Inventor: Xiangxiang Zou, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/106,416

(22) Filed: Aug. 21, 2018

(65) Prior Publication Data

US 2019/0087047 A1   Mar. 21, 2019

(30) Foreign Application Priority Data

Sep. 15, 2017 (CN) .......................... 2017 1 0831461

(51) Int. Cl.
| | |
|---|---|
| *G06F 3/041* | (2006.01) |
| *G06F 3/044* | (2006.01) |
| *G06F 3/047* | (2006.01) |
| *F21V 8/00* | (2006.01) |

(52) U.S. Cl.
CPC ......... *G06F 3/0414* (2013.01); *G02B 6/0031* (2013.01); *G06F 3/044* (2013.01); *G06F 3/047* (2013.01); *G06F 3/0412* (2013.01); *G06F 3/0416* (2013.01); *G02B 6/0055* (2013.01); *G06F 2203/04103* (2013.01)

(58) Field of Classification Search
CPC .......... G06F 3/041; G06F 3/045; G06F 3/042; G06F 3/043; G01R 27/26
See application file for complete search history.

(56) References Cited

U.S. PATENT DOCUMENTS

2016/0342259 A1    11/2016  Xiong et al.
2017/0192596 A1*   7/2017   Lee .......................... G01L 1/146
(Continued)

FOREIGN PATENT DOCUMENTS

CN    105094433 A    11/2015
CN    105717682 A    6/2016
(Continued)

OTHER PUBLICATIONS

Chinese Office Action dated Dec. 26, 2019, from application No. 201710831461.7.

*Primary Examiner* — Pegeman Karimi
(74) *Attorney, Agent, or Firm* — Foley & Lardner LLP

(57) ABSTRACT

The present disclosure provides a force touch display device and a method for manufacturing and driving the force touch display drive. The force touch display device includes an array substrate, a light guide plate and a metal reflective plate. The array substrate includes a first carrier substrate and a metal wire grid and a metal connection terminal disposed on the first carrier substrate, in which the metal connection terminal is electrically connected to the metal reflective plate. The metal wire grid includes a plurality of metal wires arranged in parallel, and the metal wire grid is configured so that light passing through the metal wire grid becomes linearly polarized light. The light guide plate disposed between the array substrate and the metal reflective plate.

11 Claims, 7 Drawing Sheets

(56) References Cited

U.S. PATENT DOCUMENTS

| | | | | |
|---|---|---|---|---|
| 2017/0235392 A1* | 8/2017 | Ishii | ................ | G06F 3/0416 |
| | | | | 345/174 |
| 2017/0242524 A1* | 8/2017 | Kim | ................ | G06F 3/0416 |
| 2018/0203280 A1* | 7/2018 | Yamashita | ............ | G02F 1/1368 |
| 2018/0284539 A1* | 10/2018 | Zha | ................ | G02F 1/133555 |
| 2019/0067795 A1* | 2/2019 | Shin | ................ | H01Q 1/50 |

FOREIGN PATENT DOCUMENTS

| CN | 106154655 A | 11/2016 |
|---|---|---|
| CN | 106201115 A | 12/2016 |
| CN | 107037628 A | 8/2017 |

\* cited by examiner

US 10,705,642 B2

FORCE TOUCH DISPLAY DEVICE AND METHOD FOR MANUFACTURING AND DRIVING THE SAME

CROSS REFERENCE

This application is based upon and claims priority to Chinese Patent Application No. 201710831461.7, filed on Sep. 15, 2017, the entire contents thereof are incorporated herein by reference.

TECHNICAL FIELD

The present disclosure relates to a force touch display device and a method for manufacturing and driving the force touch display device.

BACKGROUND

As a user's experience requirement for a touch display device increasingly grows, and a touch technique increasingly develops, use of force-sensitive device greatly enhances the user's experience and provides the user with a multi-dimensional experience and operation.

The force-sensitive device of the related technology is mainly divided into resistive type, capacitive type, and optical type. The capacitive type force-sensitive device changes a distance between electrodes on both surfaces of a capacitor by the user's finger applying pressure on a touch screen, and therefore changing the value of the capacitance, such that force could be sensed by detecting variations of the capacitance. Due to requirement for deformation, a special arrangement is required for the touch device.

Therefore, there are also some technical solutions in the related art to be improved.

It should be noted that the information as disclosed in the Background merely serves to enhance understanding of the background of the present disclosure, and therefore may include information that does not constitute the related art that has been known to those skilled in the art.

SUMMARY

According to some arrangements of the present disclosure, there is provided with a force touch display device, including an array substrate, a light guide plate and a metal reflective plate. The array substrate includes a first carrier substrate and a metal wire grid and a metal connection terminal disposed on the first carrier substrate, in which the metal connection terminal is electrically connected to the metal reflective plate; and the metal wire grid includes a plurality of metal wires arranged in parallel, and the metal wire grid is configured so that light passing through the metal wire grid becomes linearly polarized light. The light guide plate disposed between the array substrate and the metal reflective plate.

In one exemplary arrangement of the present disclosure, the metal connection terminal is electrically connected to the metal reflective plate through a conductive tape.

In one exemplary arrangement of the present disclosure, both the metal wire grid and the metal connection terminal are disposed on a surface of the first carrier substrate facing away from the light guide plate.

In one exemplary arrangement of the present disclosure, the array substrate defines a display area and a non-display area, the metal wire grid is disposed in the display area, and the metal connection terminal is disposed in the non-display area.

In one exemplary arrangement of the present disclosure, the metal wire grid is an integral pattern.

In one exemplary arrangement of the present disclosure, the metal wire grid includes a plurality of electrode patterns distributed in a matrix, and the adjacent electrode patterns are separated by a partition area.

In one exemplary arrangement of the present disclosure, the force touch display device further includes a color film substrate; the array substrate and the color film substrate are oppositely disposed; the color film substrate includes a second carrier substrate and a plurality of color film layers and black matrix units distributed at a distance with each other on the second carrier substrate; and a projection of the metal wire grid falls within a projection of the color film layer; and a projection of the partition area falls within a projection of the black matrix unit.

In one exemplary arrangement of the present disclosure, the array substrate further includes a touch driving circuit; the touch driving circuit is disposed in a non-display area, and the touch driving circuit is electrically connected to the metal connection terminal.

In one exemplary arrangement of the present disclosure, the array substrate further includes a display driving circuit, and the display driving circuit is disposed in the non-display area.

In one exemplary arrangement of the present disclosure, the metal connection terminal is connected to a ground terminal or a DC signal terminal.

In one exemplary arrangement of the present disclosure, the metal wire grid has a thickness range of 100 nm to 200 nm.

According to some arrangements of the present disclosure, there is provided with a method for manufacturing a force touch display device, including:

providing a first carrier substrate, forming a metal wire grid, a metal connection terminal, a driving element, and a switching element on the first carrier substrate to obtain an array substrate, in which the metal wire grid includes a plurality of metal wires arranged in parallel, and the metal wire grid is configured so that light passing through the metal wire grid becomes a linearly polarized light;

attaching a light guide plate and a metal reflective plate to a surface of the array substrate facing away from the metal wire grid and the metal connection terminal, and the light guide plate is disposed between the array substrate and the metal reflective plate; and electrically connecting the metal reflective plate to the metal connection terminal.

In one exemplary arrangement of the present disclosure, the method for manufacturing the force touch display device further includes providing a second carrier substrate, forming a plurality of color film layers and black matrix units distributed at a distance with each other on the second carrier substrate to obtain a color film substrate;

oppositely disposing the array substrate and the color film substrate to form a display panel. A projection of the metal wire grid falls within a projection of the color film layer.

In one exemplary arrangement of the present disclosure, the metal wire grid, the metal connection terminal, the driving element, and the switching element are formed on the first carrier substrate by a patterning process;

a plurality of the color film layers and the black matrix units that are distributed at a distance with each other are formed on the second carrier substrate by a patterning process.

According to a further arrangement of the present disclosure, a method for driving a force touch display device is further provided. The force touch display device includes:

an array substrate that includes a first carrier substrate and a metal wire grid and a metal connection terminal disposed on the first carrier substrate, in which the metal connection terminal is electrically connected to the metal reflective plate; and the metal wire grid includes a plurality of metal wires arranged in parallel, and the metal wire grid is configured so that light passing through the metal wire grid becomes linearly polarized light;

a metal reflective plate; and a light guide plate disposed between the array substrate and the metal reflective plate;

The method for driving a touch display device including:

providing a ground signal or a DC signal to the metal reflective plate; and when pressure acts on the force touch display device, the pressure is calculated by detecting variations of a capacitance between the metal wire grid and the metal reflective plate.

It should be appreciated that both the foregoing general description and the following detailed description are exemplary and explanatory only but limit the present disclosure.

BRIEF DESCRIPTION OF THE DRAWINGS

The accompanying drawings herein, which are incorporated in and constitute a part of the present description, illustrate arrangements of the present disclosure and together with the description serve to explain the principle of the present disclosure. Obviously, the drawings in the following description are provided to merely illustrate some of the arrangements of the present disclosure. For those ordinary skilled in the art, other drawings may also be obtained according to these drawings without any creative work.

DETAILED DESCRIPTION

Figure 1:
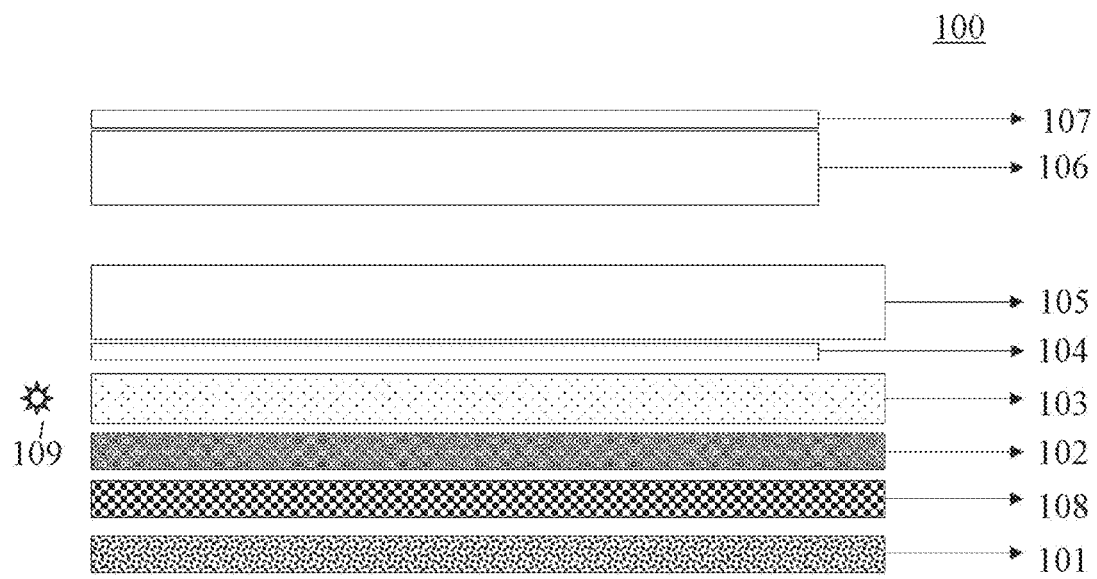
FIG. 1 shows a schematic sectional view of a force touch display device in a related arrangement.

Now, the exemplary arrangements will be described more fully with reference to the accompany drawings. However, the exemplary arrangements can be implemented in various forms and should not be construed as limited to the arrangements set forth herein. Instead, these arrangements are provided so that this disclosure will be thorough and complete, and the concept of the exemplary arrangement will fully conveyed to those skilled in the art. The figures of the present disclosure are only illustrative, but not necessarily to scale. Same reference signs denote the same or similar structures in the accompany drawings, and thus the detailed description thereof will be omitted.

In addition, the above described features, structures, or characteristics may be combined in one or more arrangements in any suitable manner. In the description below, numerous specific details are provided for fully understanding the arrangements of the present disclosure. However, it will be aware for the person skilled in the art that the technical solutions of the present disclosure practiced without one or more of the specific details, or by using other methods, components, materials, etc. may be employed. In other instances, well-known structures, materials, or operations are not shown or described in detail to avoid obscuring various arrangements of the present disclosure.

Some block diagrams as shown in the accompanying figures are functional entities but not necessarily correspond to physically or logically independent entities. These functional entities may be implemented by means of software, or implemented in one or more hardware modules or integrated circuits, or implemented in different networks and/or processor devices and/or microcontroller devices.

In this context, the orientation terms "inside" and "outside" refer to a side facing to the liquid crystal layer and a side facing away from the liquid crystal layer, respectively. For example, the inside of the substrate refers to a layer of the substrate facing to the liquid crystal layer. In addition, the orientation terms of "up", "down", "left", and "right" are defined with respect to the orientation indicated by the display device in the drawings. It should be understood that the above-mentioned orientation terms are relative concepts for relative description and clarification, and therefore may be changed accordingly according to change of the orientation of the display device.

FIG. 1 shows a schematic sectional view of a force touch display device in a related arrangement. The force touch display device 100 includes: a metal protection frame 101, a force touch layer 108, a reflective film 102, a light guide plate 103, a lower polarizer 104, an array substrate 105, a color filter substrate 106, and an upper polarizer 107. As shown in FIG. 1, in the force touch display device 100, one layer of the force touch layer 108 is separately disposed between the light guide plate 103 and the metal protection frame 101, so that a distance between each of electrode layers and the force touch layer 108 in a panel may change when the finger presses on the force touch display device, and the force touch layer 108 detects changes of a capacitance due to press by the finger, therefore achieving sensing of the pressure. In addition, an LED (Light Emitting Diode)

109 is also provided as a light source on a side of the light guide plate 103 in FIG. 1. As can be seen, this structure also needs an extra layer of force touch layer, which will increase thickness of a module, and therefore cannot meet the technical development requirements for a thin and light module.

Figure 2:
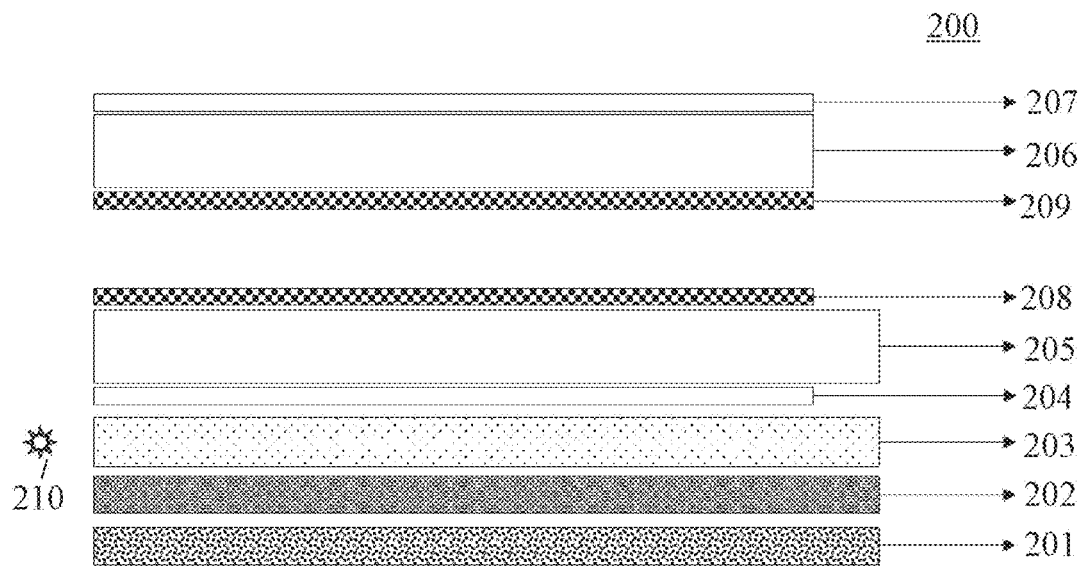
FIG. 2 shows a schematic sectional view of another force touch display device in a related arrangement.

FIG. 2 shows a schematic sectional view of another force touch display device in a related arrangement. The force touch display device 200 includes a metal protection frame 201, a reflective film 202, a light guide plate 203, a lower polarizer 204, an array substrate 205, a color film substrate 206, and an upper polarizer 207. A force touch lower electrode layer 208 and a force touch upper electrode layer 209 are disposed between the array substrate 205 and the color film substrate 206. As shown in FIG. 2, the force touch upper electrode layer 209 is disposed on a surface of the color film substrate 206 close to the array substrate 207, and the force touch lower electrode layer 208 is disposed on a surface of the array substrate 207 close to the color film substrate 206. In addition, an LED 210 is also provided as a light source on the side of the light guide plate 203 in FIG. 2. The force touch lower electrode layer 208 in the structure shown in FIG. 2 is shared with metal wire(s) or a transparent common electrode of the display panel, so that it is required to perform time-division driving when driving, i.e., the force touch detection does not work while the display driving is performed, and the display driving does not work while the force touch detection is performed, which greatly increases difficulty of driving. Due to sharing the electrodes, when the force touch detection works, the display effect will be affected to a certain extent, in severe cases, the display performance will be greatly worse.

As above described, the force touch layers of force touch display devices in the related arrangements as shown in FIG. 1 and FIG. 2 are required to be specially set, which cannot guarantee to meet the requirement for light and thin module nor ensure that the display effect is not affected.

Figure 3:
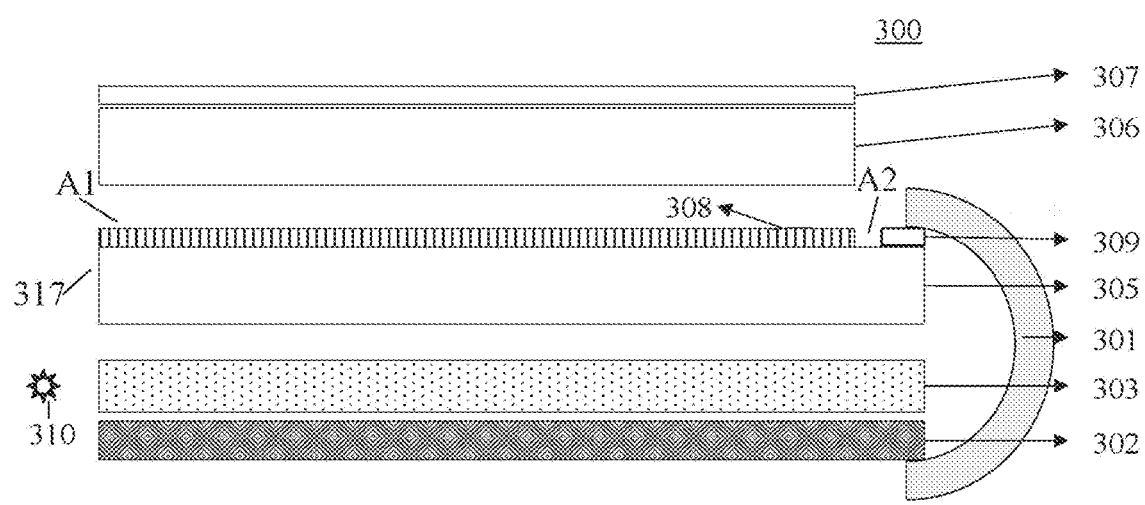
FIG. 3 shows a schematic sectional view of a force touch display device as provided in one arrangement of the present disclosure.

FIG. 3 shows a schematic sectional view of a force touch display device as provided in one arrangement of the present disclosure. As shown in FIG. 3, the force touch display device 300 includes an array substrate 317, a light guide plate 303 and a metal reflective plate 302.

The array substrate 317 includes a first carrier substrate 305, a metal wire grid 308 and a metal connection terminal 309 disposed on the first carrier substrate 305, and the metal connection terminal 309 is electrically connected with the metal reflective plate 302. The light guide plate 303 is disposed between the array substrate 317 and the metal reflection plate 302. The metal line grid 308 is composed of a plurality of metal wires arranged in parallel so that the light passing through the metal line grid becomes a linearly polarized light.

It should be noted that the metal wire grid is located in the display area A1 of the array substrate, and the metal connection terminal is located in the non-display area A2 of the array substrate. In addition, the array substrate 317 in the present arrangement includes the metal wire grid 308 and the metal connection terminal 309 provided on the first carrier substrate 305, besides, further includes a structure in the conventional process (not shown in FIG. 3), for example, a gate, a source, a drain of a switching element and a driving element and a pixel electrode, and a common electrode and the like, and also includes a film layer such as an insulating layer and an interlayer dielectric layer between the electrode layers, which are not be described in this arrangement.

As shown in FIG. 3, in this arrangement, the metal connection terminal 309 on the array substrate 317 is electrically connected to the metal reflective plate 302 by a conductive tape 301, and the metal connection terminal 309 is connected to a GND or a direct current (DC) signal terminal, and input the GND or the DC signal to the metal reflective plate 302. The conductive tape 301 may be bonded to any metal surface to achieve an electro-lapping and an conductive closure to a gap, for example, the metal connection terminal 309 and the metal reflective plate 302 in this arrangement are metal surfaces and can be bonded with each other through the conductive tape, such that electrical connection between the metal connection terminal 309 and the metal reflective plate 302 is achieved.

It should be noted that the metal reflective plate 302 in this arrangement may be an entire metal plate with a reflective layer on the surface facing the light guide plate. One surface of the metal plate facing the light guide plate is polished to form the reflective layer. In FIG. 3, a LED 310 is also provided as a light source on the surface of the light guide plate 303. The light emitted from the LED 310 becomes an area light source through the light guide plate 303 to provide the light source for the display device. In addition, the metal reflective plate 302 in this arrangement may take a function of reflecting light through the reflective layer, but also may function as a metal protection frame, that is, the metal reflective plate in this arrangement may function as the reflective films 102, 202 and the metal protection frames 101, 201 in FIG. 1 and FIG. 2. Therefore, the metal reflective plate employed in this arrangement can achieve reflective function but also protection function, save space, and avoid increasing the thickness of the display device.

Figure 4:
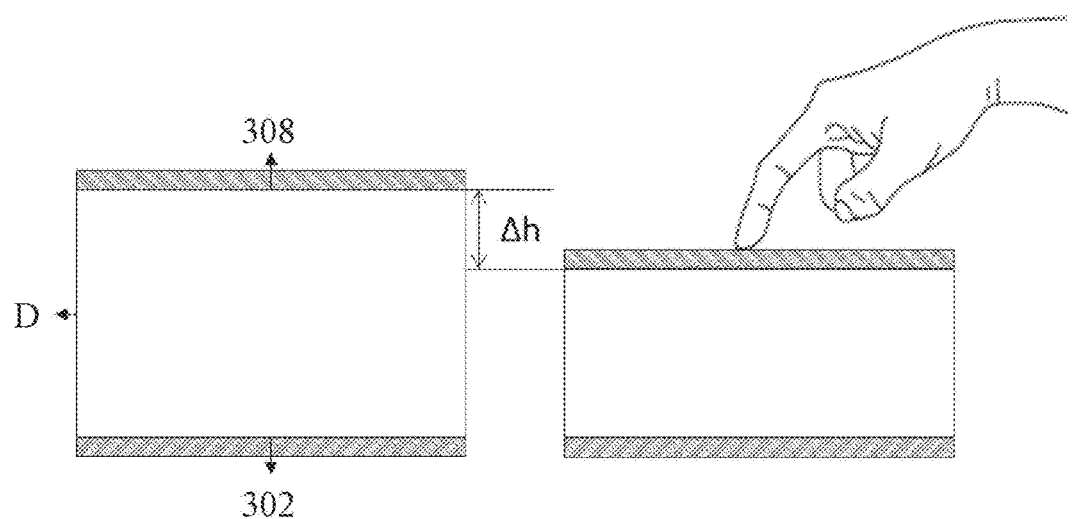
FIG. 4 shows a schematic view of a principle of the pressure sensor in one arrangement of the present disclosure.

In this arrangement, FIG. 4 shows a schematic view of a principle of the pressure sensor in one arrangement of the present disclosure. The pressure sensor is a capacitive pressure sensor. As shown in FIG. 4, the metal wire grid 308 acts as an upper electrode layer for force touch, and the metal reflective plate 302 acts as a lower electrode layer for force touch, and a dielectric layer D is sandwiched between the electrodes of the two metals. The dielectric layer D in this arrangement refers to all film layers between the metal reflective plate 302 and the metal wire grid 308 as shown in FIG. 3, such as the first carrier substrate 305, the light guide plate 303, and a gap between the plates. The dielectric layer D further may include each common film layers (not shown in FIG. 3).

When an electrode layer is applied by a pressure, all the film layers between the metal wire grid 308 and the metal reflective plate 302 undergo compressive deformation, such that a distance between the upper electrode layer and the lower electrode layer may be changed, and furthermore, the capacitance between the upper electrode layer and the lower electrode layer is changed. The pressure is detected according to variation of the capacitance. As shown in FIG. 4, when the finger touches the display panel, the dielectric between the two electrode layers, under the pressure of the fingers, is compressed, such that the distance between the two electrode layers is reduced with a variation Δh. According to calculation formula of the plate capacitor: $C=(\varepsilon*S)/d$, can be seen that the capacitance C increases as the distance d between the two electrode layers (i.e., the metal reflective plate 302 and the metal wire grid 308) becomes smaller. In this way, the pressure may be detected by measuring the capacitance between the two electrode layers.

Figure 5:
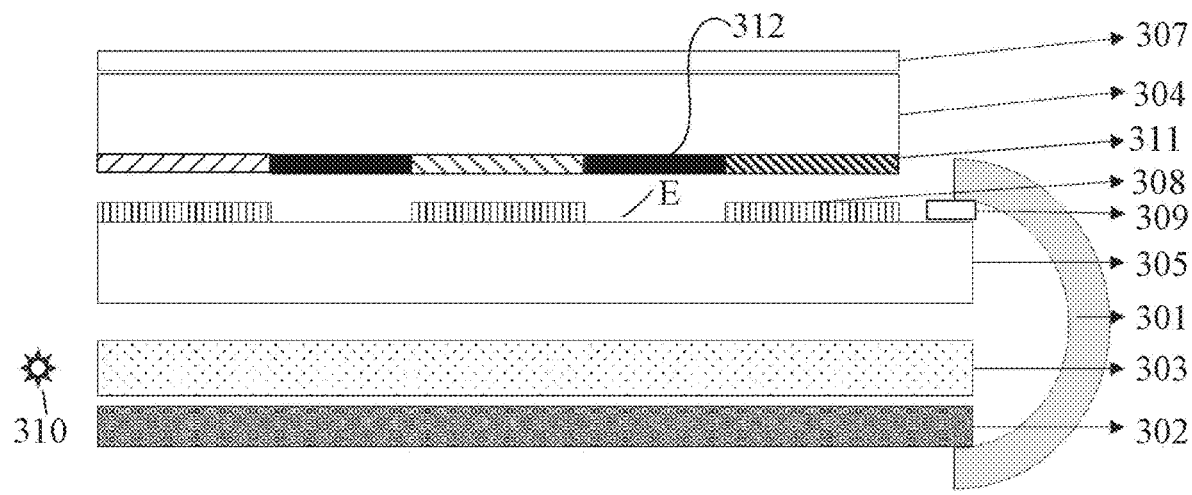
FIG. 5 shows a schematic sectional view of another force touch display device as provided in one arrangement of the present disclosure.

The metal wire grid in this arrangement may be used as an integral electrode plate, or may be divided into a matrix-type electrode pattern corresponding to a plurality of (e.g., n*n) touch cells. FIG. 3 in this arrangement shows a schematic sectional view of the metal wire grid being an integral electrode plate. FIG. 5 shows a schematic sectional view of the metal wire grid including a plurality of electrode patterns, for example, 3*3=9 electrode patterns. FIG. 3 does not show the specific structure of the color film substrate 306 but only shows the integrated structure thereof. However, FIG. 5 shows that the color film substrate includes the second carrier substrate 304 and the color film layer 311 and a black matrix unit 312 that are distributed at a distance with each other on the second carrier substrate 304.

Figure 6:
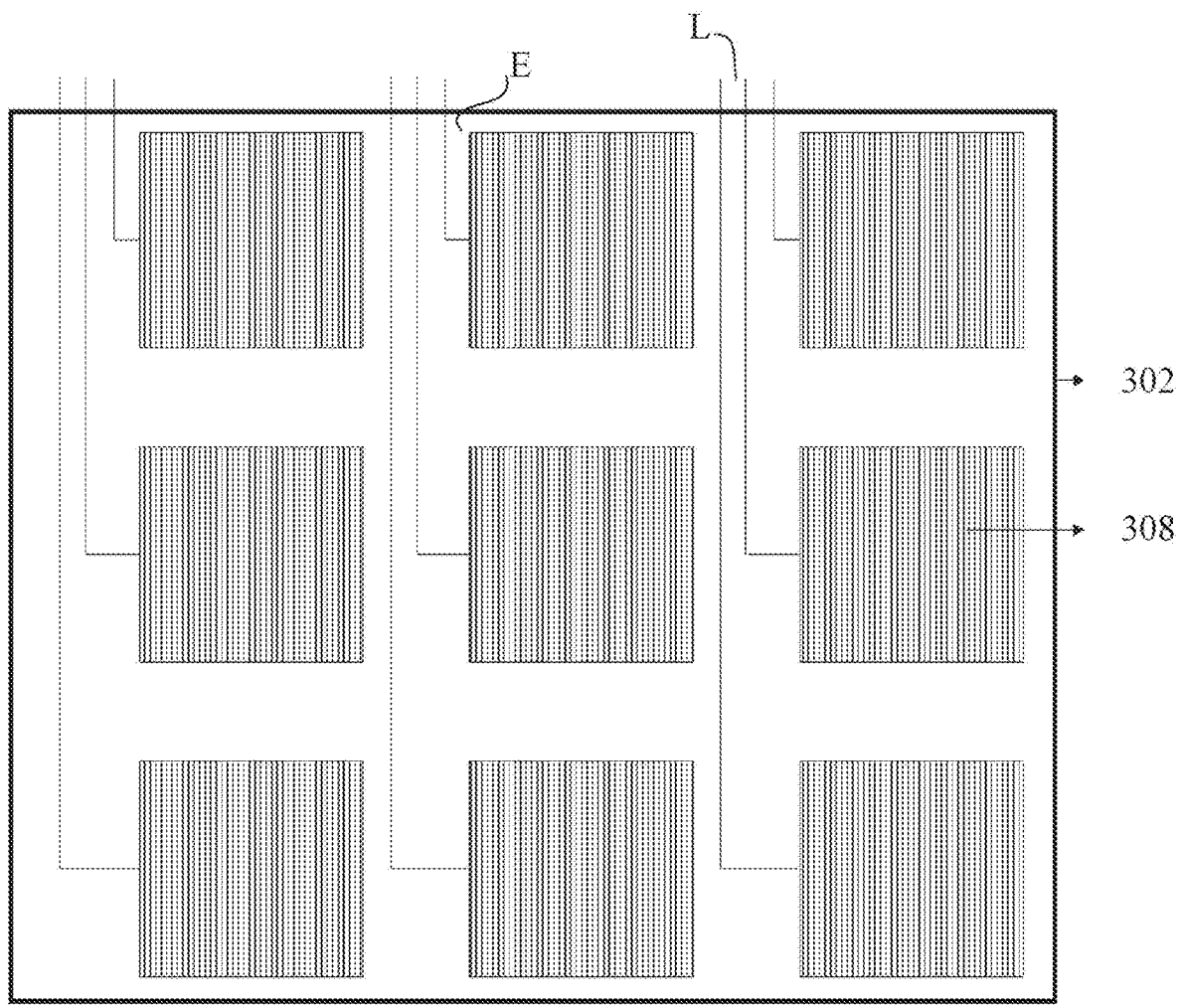
FIG. 6 shows a top view of a metal wire grid structure in one arrangement of the present disclosure.

FIG. 6 shows a top view of the structure of a metal wire grid in this arrangement, corresponding to the schematic sectional view of FIG. 5. As shown in FIG. 6, the metal reflective plate 302 as a lower electrode layer is an integrated structure, and the metal wire grid 308 as the upper electrode layer includes a plurality of matrix-type electrode patterns, and the adjacent electrode patterns are separated by a partition area E. As shown in FIG. 6, the partition E further includes a connection line L for connecting each electrode (a touch electrode or a sensing electrode) in the upper electrode layer to a control circuit (not shown). The structure as shown in FIG. 6 may realize multi-point force touch sensing, while in case that the metal wire grid as shown in the schematic sectional view of FIG. 3 acts as an integrated electrode plate, a single-point force touch sensing may be achieved.

Figure 7:
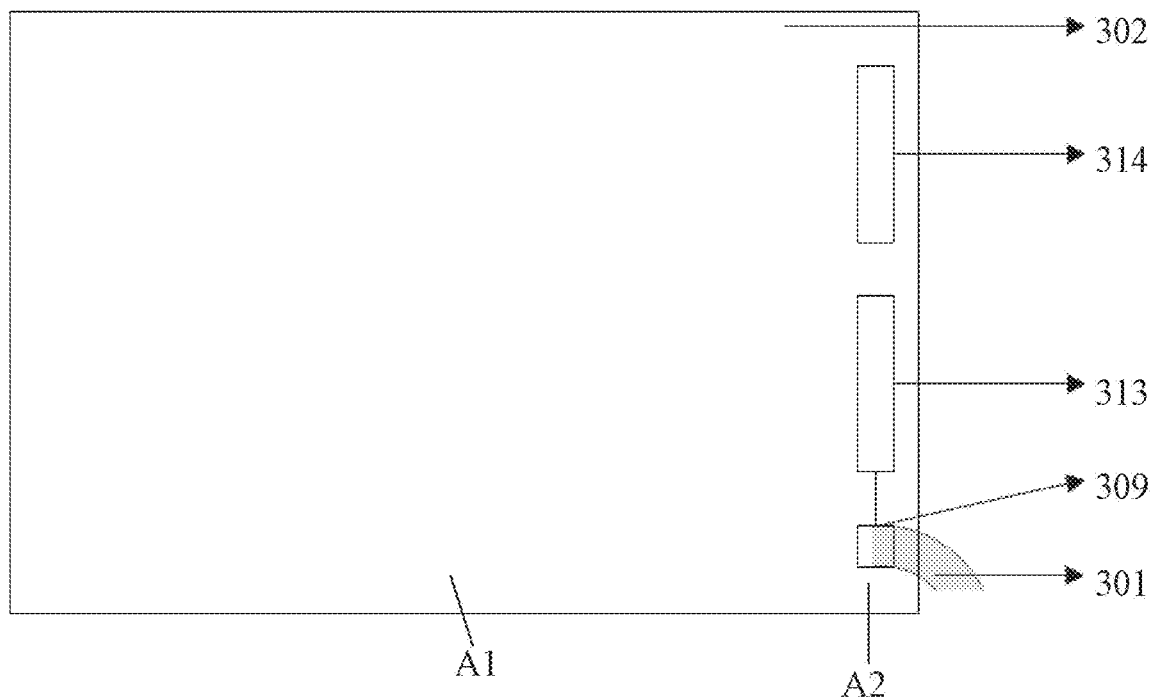
FIG. 7 shows a schematic view of positional relationship between a touch driving circuit and a display driving circuit on an array substrate in one arrangement of the present disclosure.

In addition, FIG. 7 is a schematic view showing positional relationship between a touch driving circuit and a display driving circuit on an array substrate in this arrangement. The array substrate 317 in this arrangement further includes a touch driving circuit (touch IC) 313 and a display driving circuit (display IC) 314 disposed in the non-display area A2 (i.e., the peripheral position) of the array substrate. The touch driving circuit 313 is electrically connected to the metal connection terminal 309, and the metal connection terminal 309 is electrically connected to the metal reflective plate 302 through the conductive tape 301.

As shown in FIG. 5, the force touch display device 300 in this arrangement further includes a color film substrate. The color film substrate includes a second carrier substrate 304 and a plurality of color film layers 311 and the black matrix units 312 disposed at a distance with each other on the second carrier substrate 304.

As shown in FIG. 6, when the metal wire grid 308 includes a plurality of matrix-type electrode patterns, a projection of the metal wire grid 308 falls within a projection of the color film layer 311, and projections of the partition area E and the connection line L in the partition area E Fall within the projection of the black matrix unit 312.

It should be noted that the metal wire grid 308 in this arrangement is composed of a plurality of metal wires arranged in parallel, so that the light passing through the metal wire grid becomes linearly polarized light. The metal wire grid used as the upper electrode layer can function as an electrode, and also function as a polarizer for the light such that a lower polarizer can be omitted when the array substrate is applied to the display device. In addition, in this arrangement, a polarization direction of the light through the metal wire grid and a polarization direction of the light through the upper polarizer 307 on the outside of the color film substrate are perpendicular to each other or have a certain angle therebetween, so as to play a function of polarizing the light in different directions. FIG. 6 shows an example of a metal wire grid in which a plurality of metal wires is arranged along a vertical direction. In other arrangements, the direction of arranging the metal wires may be changed adaptively. It should be noted that the "vertical" herein is described with reference to the current orientation of the top view as shown in FIG. 6. If the top view as shown in FIG. 6 is rotated, changes of the corresponding orientation will also be described accordingly. Whether the arrangement direction of the metal wire is described as "vertical" or "horizontal" is not a key point of the present disclosure, as long as the metal wire grid 308 and the upper polarizer 307 play a function of polarizing light in different directions.

Both the metal wire grid 308 and the metal connection terminal 309 in this arrangement are disposed on a surface of the first carrier substrate 305 facing away from the light guide plate 303, that is, the metal wire grid is oriented toward an inner surface of the array substrate 317. When the metal connection terminal 309 and the metal reflective plate 302 are connected by a conductive tape, a first carrier substrate 305 and the light guide plate 303 between the metal connection terminal 309 and the metal reflective plate 302, and a gap between the plates are used as a dielectric layer.

Figure 8:
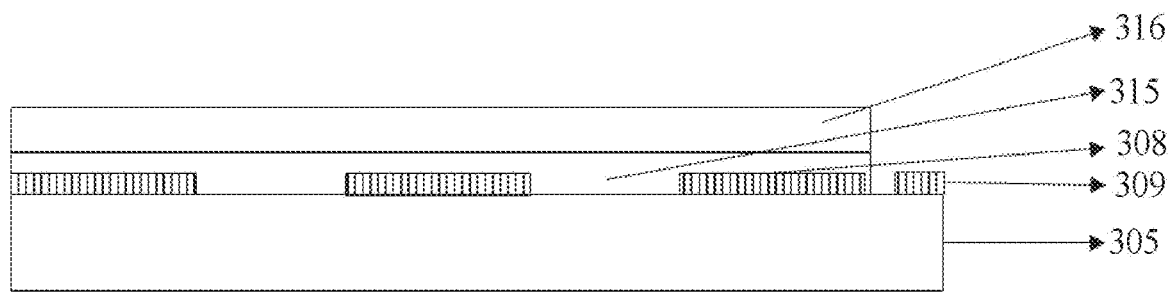
FIG. 8 is a schematic view showing that a metal connection terminal and a metal wire grid on the array substrate are on the same layer in one arrangement of the present disclosure.
Figure 9:
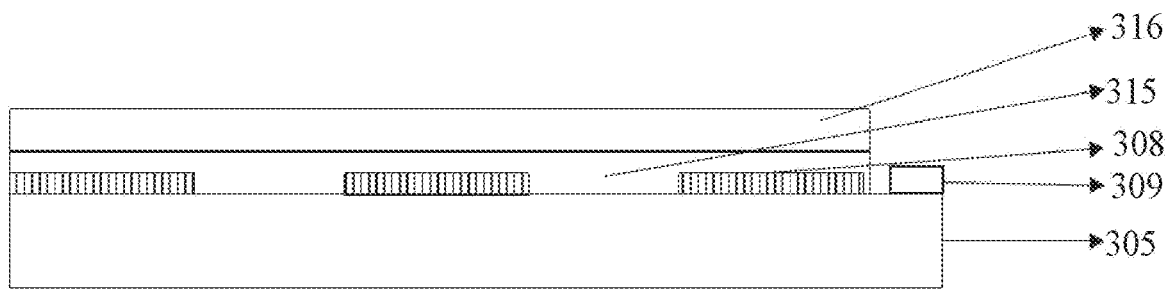
FIG. 9 is a schematic view showing that the metal connection terminal and the metal wire grid on the array substrate are not on the same layer in one arrangement of the present disclosure.

In addition, the metal connection terminal 309 and the metal wire grid 308 in this arrangement may be in the same layer or different layers. FIG. 8 shows a schematic view of a metal connection terminal and a metal wire grid on the array substrate being on the same layer in one arrangement of the present disclosure. As shown in FIG. 8, the metal layers on the same layer on the first carrier substrate 305, by means of a patterning process, is formed with the metal layer grids 308 in the display area and is formed with the metal connection terminals 309 in the non-display area, respectively. A partition area on and between the metal wire gates is further provided with a flat layer 315. A layer structure (indicated by 316) with a conventional back panel process is provided over the flat layer 315, such as the gate electrode, the source electrode, the drain electrode of the switching element and the driving element, the pixel electrode and the common electrode, etc., and also includes a film layer such as the insulating layer and the interlayer dielectric layer between the electrode layers. FIG. 9 is a schematic view showing that the metal connection terminal and the metal wire grid on the array substrate are not on the same layer in this arrangement. As shown in FIG. 9, a metal wire grid 308 is firstly formed in the display area through the patterning process on a first carrier substrate 305. A flat layer 315 is further provided in the partition area on and between the metal wire grids 308. And a layer structure (indicated by 316) with a conventional back panel process is provided over the flat layer 315, such as the gate electrode, the source electrode, the drain electrode of the switching element and the driving element, the pixel electrode and the common electrode, etc., and also includes a film layer such as the insulating layer and the interlayer dielectric layer between the electrode layers. Finally, a metal connection terminal is formed in the non-display area by means of the patterning process, so that the metal connection terminal and the metal wire grid are not on the same layer. In addition, the metal connection terminal may also be formed with the same metal layer in the conventional back panel process, for example, formed with the same metal layer of the gate electrode, the source electrode or the drain electrode.

It should be noted that FIG. 8 and FIG. 9 are schematic views of an array substrate. Since only the relationship between the metal connection terminal and the metal gate wire in the array substrate is shown, structure of the each film layer in the array substrate is not shown, for example, the details are not shown for the traditional back panel process.

In this arrangement, a wire of the metal wire grid has a width range of 50 nm to 100 nm, and a wire spacing range of 50 nm to 100 nm, in which there are 10 nm errors, such as 40 nm, 50 nm, 70 nm, 80 nm, and 110 nm, if the process permits, it is possible to make the wire spacing smaller, and a thickness range of 100 nm to 200 nm. Therefore, adding a metal wire grid into a conventional process of the array substrate may not bring about a significant influence on the overall thickness of the display device.

As above described, in this arrangement, the metal wire grid is used together with the upper electrode layer, which can function as an electrode of the upper electrode layer but also function as a polarizer. The metal wire grid is integrated in the array substrate, and is not used together with any other metal wire or a transparent electrode, so as to reduce the difficulty for driving, without increasing the thickness of the display device, so that thickness and cost reduction may be achieved.

As above described, in the array substrate, the metal wire grid is used as the upper electrode layer, the metal reflective plate is used as the lower electrode layer, and the metal connection terminal is electrically connected to the metal reflective plate. When the fingers touch the display panel, all film layers between the first carrier substrate and the metal reflective plate undergo compressive deformation under the pressure, that is, to change the distance between the upper electrode layer and the lower electrode layer, and therefore changing the capacitance between the upper electrode layer and the lower electrode layer, and the pressure is detected due to variation of the capacitance. The force touch display device as provided by the present disclosure does not increase the thickness of the display device, may reduce the thickness, and is not used together with any other metal wire or the transparent electrode. This may greatly reduce the difficulty for driving and may achieve low cost.

Figure 10:
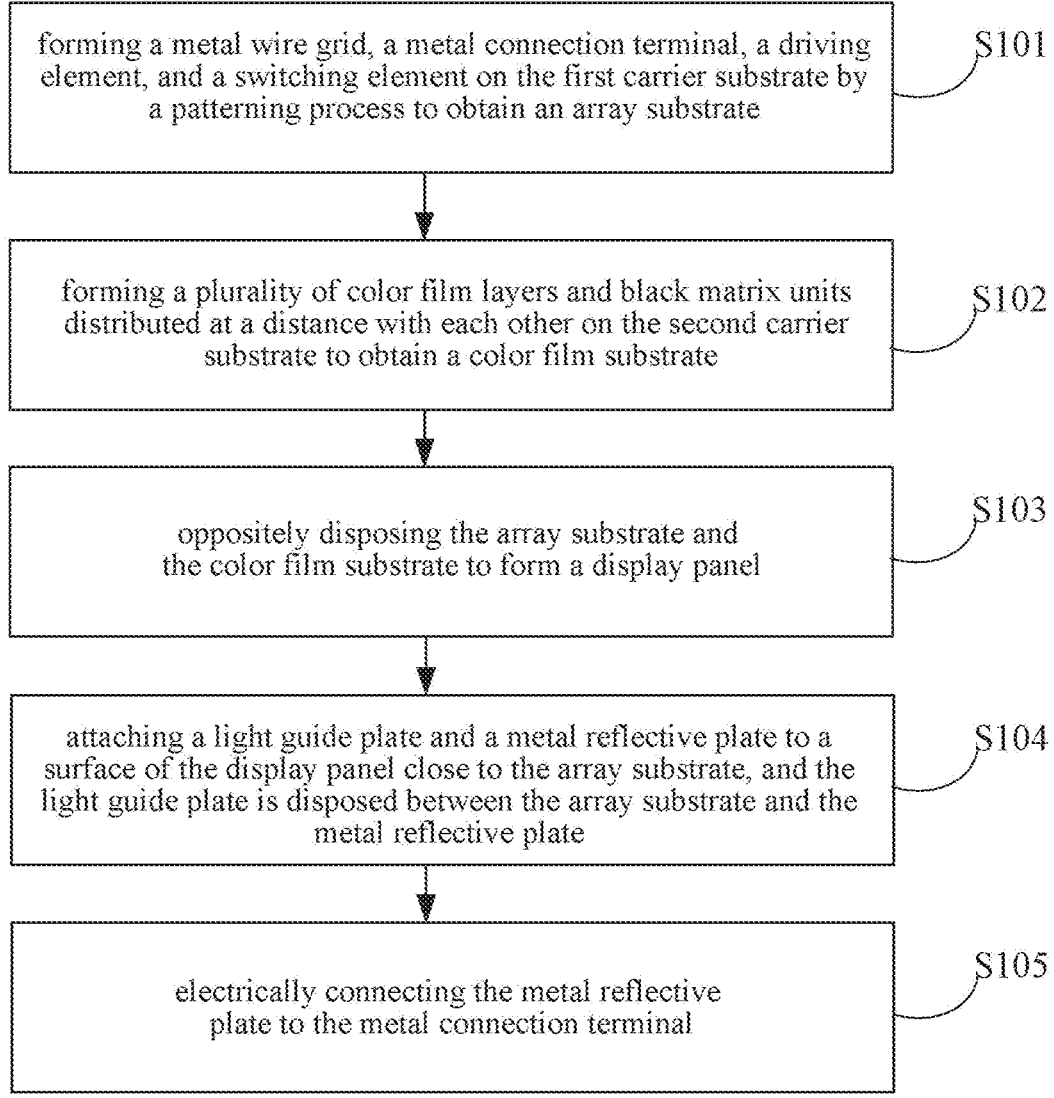
FIG. 10 shows a schematic view of a method for manufacturing the force touch display device according to another arrangement of the present disclosure.

FIG. 10 also shows a schematic view of a method for manufacturing the force touch display device according to another arrangement of the present disclosure.

As shown in FIG. 10, in S101, a metal wire grid, a metal connection terminal, a driving element, and a switching element are formed on a first carrier substrate by using a patterning process, such that an array substrate is obtained. The metal wire grid is composed of a plurality of metal wires arranged in parallel so that light becomes a linearly polarized light through the metal wire grid. The metal wire grid is formed in the display area of the array substrate, and the metal connection terminal is formed in the non-display area of the array substrate.

In this arrangement, the metal wire grid and the metal connection terminal are formed by metal layers on the same layer or different layers.

As an example of the metal wire grid and the metal connection terminal being on the same layer, a method for manufacturing the array substrate includes: firstly, forming a metal wire grid in the display area, and forming a metal connection terminal in the non-display area by the patterning process to the same layer of the metal layers on the first carrier substrate, and then forming a flat layer in a partition area between the meal wire grid and the metal wire grid, forming a layer structure, such as a gate electrode, a source electrode, and a drain electrode of the switching element and the driving element and the pixel electrode and the common electrode, etc., with the conventional back panel process over the flat layer, and including a film layer such as an insulating layer and an interlayer dielectric layer between the electrode layers, such that a structure of the array substrate as shown in FIG. 8 is obtained.

As an example of the metal wire grid and the metal connection terminal being on different layers, a method for manufacturing an array substrate includes: firstly, forming a metal wire grid on a first carrier substrate by the patterning process, and then forming a flat layer in a partition area on and between the meal wire grid and the metal wire grid, forming a layer structure of the conventional back panel, such as a gate electrode, a source electrode, and a drain electrode of the switching element and the driving element and the pixel electrode and the common electrode, etc., over the flat layer, and including a film layer such as an insulating layer and an interlayer dielectric layer between the electrode layers, finally forming a metal connection terminal in the non-display area by the patterning process, such that a structure of the array substrate as shown in FIG. 9 is obtained.

As an example of the metal wire grid and the metal connection terminal being on different layers, a method for manufacturing an array substrate may include: firstly, forming a metal wire grid on a first carrier substrate by means of a patterning process on the first carrier substrate, forming a flat layer in a partition area on and between the meal wire grid and the metal wire grid, and then forming a layer structure of conventional back panel, such as a gate electrode, a source electrode, and a drain electrode of the switching element and the driving element, etc., over the flat layer, a metal connection terminal is formed in the non-display area by patterning process for the gate metal layer or the source and drain electrode metal layers during the gate electrode or the source and drain electrode are formed, and finally, including the pixel electrode and/or the common electrode, and a film layer such as an insulating layer and an interlayer dielectric layer between the electrode layers, such that a structure of the array substrate as shown in FIG. 9 is obtained.

As shown in FIG. 8, in order to realize multi-point force touch sensing, the metal wire grid is divided into matrix-type electrode patterns corresponding to a plurality of (e.g., n*n) touch cells, and the adjacent electrode patterns are separated by the partition area

E.

As shown in FIG. 10, in S102, a plurality of color film layers and black matrix units that are disposed at a distance are formed on the second carrier substrate by the patterning process, such that a color film substrate is obtained.

In addition, after the color film substrate is obtained, a polarizer is attached onto the outside of the color film substrate.

As shown in FIG. 10, in S103, the array substrate and the color film substrate are oppositely disposed to form a display panel.

In this arrangement, a projection of the metal wire grid in the array substrate falls within a projection of the color film layer in the color film substrate, and projections of the partition area between the metal wire grids in the array substrate fall within a projection of the black matrix unit in the color film substrate.

As shown in FIG. 10, in S104, the light guide plate and the metal reflective plate are attached to a surface of the display panel close to the array substrate, and the light guide plate is positioned between the array substrate and the metal reflective plate.

A light source is disposed on the side of the light guide plate. The light emitted from the light source (point light source) becomes a surface light source through the light guide plate to provide the light source for the display device. The metal reflective plate, in addition to playing a role of reflecting light through the reflective layer, may also play a role of the metal protection frame in the conventional structure.

As shown in FIG. 10, in S105, the metal reflective plate is electrically connected to the metal connection terminal.

For example, the metal reflective plate is electrically connected to the metal connection terminal by a conductive tape, and the metal connection terminal is connected to the GND or the direct current signal terminal to input the GND or direct current signal to the metal reflective plate.

It should be noted that the patterning process in this arrangement may include a photolithography process, alternatively, include a photolithography process and etching, and may also include printing, ink jetting, nanoimprinting, and other processes for forming a predetermined pattern. The photolithography process refers to a process of forming a pattern by using a photoresist, a mask plate, an exposure machine, or the like and including film formation, exposure, and development. In the actual processing, a corresponding patterning process may be selected according to the structure formed in the present disclosure.

As above described, according to the method for manufacturing the force touch display device as provided by the present disclosure, a metal wire grid is further formed during the array substrate is formed. The metal wire grid acts as an upper electrode layer, and the metal reflective plate acts as a lower electrode layer. The metal connection terminal in the array substrate is electrically connected to the metal reflective plate. When the finger touches the display panel, each film layer between the first carrier substrate and the metal reflective plate undergo compressive deformation under the action of pressure. That is, the distance between the upper electrode layer and the lower electrode layer is changed, such that the capacitance between upper electrode layer and the lower electrode layer is changed. Detection of the pressure is performed by the changes of the capacitance. The force touch display device obtained by means of the method does not increase the thickness of the display device, may achieve light and thin display device, and may not be used together with any metal wire or transparent electrode, and therefore greatly reducing driving difficulty and reducing the cost.

Figure 11:
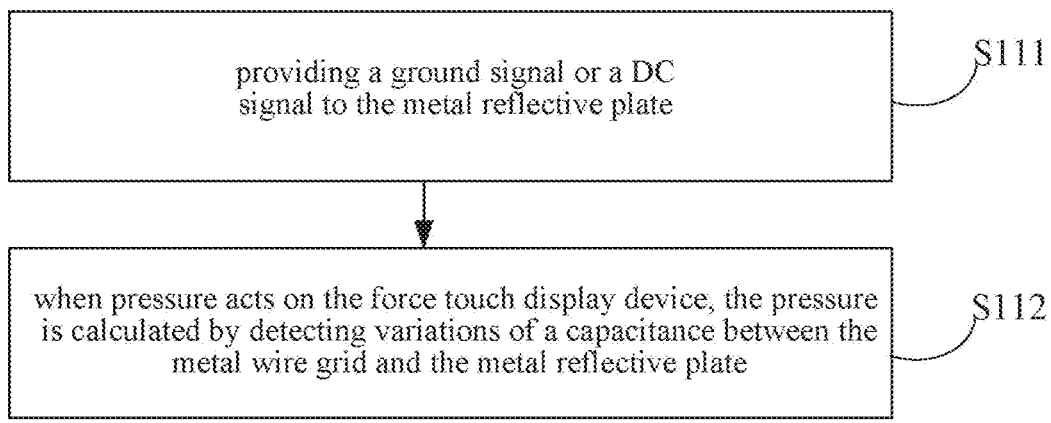
FIG. 11 shows a schematic view of a method for driving the force touch display device according to another arrangement of the present disclosure.

FIG. 11 also shows a schematic view of a method for driving the force touch display device according to another arrangement of the present arrangement.

As shown in FIG. 11, in S111, a ground signal or a direct current signal is supplied to the metal reflective plate. In this arrangement, the touch driving circuit is electrically connected with the metal connection terminal, and the metal connection terminal is electrically connected to the metal reflective plate by the conductive tape, so that the ground signal or the DC signal may be input to the metal reflective plate through the touch driving circuit.

When the finger touches the display panel of the force touch display device, the dielectric between the metal wire grid and the metal reflective plate, under the pressure of the finger, is compressed, the distance between the two electrode layers is reduced with a variation Δh. As shown in FIG. 4, according to calculation formula of the plate capacitor: $C=(\varepsilon*S)/d$, it can be seen that the capacitance C increases as the distance d between the metal reflective plate and the metal wire grid becomes smaller. In this way, the pressure may be detected by measuring the capacitance between the two electrode layers.

A driving method as provided in this arrangement may achieve the same technical effect as the aforesaid force touch display device and its manufacturing method, and therefore omitted herein.

As above described, according to the force touch display device, and a method for manufacturing and driving the force touch display device as provided in some arrangements of the present disclosure, the metal wire grid in the array substrate acts as an upper electrode layer, and the metal reflective plate acts as a lower electrode layer. The metal connection terminal in the array substrate is electrically connected to the metal reflective plate. When the finger touches the display panel, each film layer between the first carrier substrate and the metal reflective plate undergo compressive deformation under the action of pressure. That is, the distance between the upper electrode layer and the lower electrode layer is changed, such that the capacitance between upper electrode layer and the lower electrode layer is changed. Detection of the pressure is performed by the changes of the capacitance. The force touch display device obtained by means of the method does not increase the thickness of the display device, may achieve light and thin display device, and may not be used together with any metal wire or transparent electrode, and therefore greatly reducing driving difficulty and reducing the cost.

It should make sense that the present disclosure describes how to form and use the particular examples, but the principle of the present disclosure is absolutely not limited to any detail of these examples. Rather, the principles may be used in many other arrangements according to teaching of the present disclosure.

While the present disclosure has been described in detail in connection with the exemplary arrangements, it should be readily understood that the present disclosure is not limited to such disclosed arrangements. Rather, various alternations and equivalents of such metes and bounds are therefore intended to be embraced by the appended claims.

What is claimed is:

1. A force touch display device, comprising:
a metal reflective plate;
an array substrate, that comprises a first carrier substrate and a metal wire grid and a metal connection terminal disposed on the first carrier substrate, in which the metal connection terminal is electrically connected to the metal reflective plate; and the metal wire grid comprises a plurality of metal wires arranged in parallel, and the metal wire grid is configured so that light passing through the metal wire grid becomes linearly polarized light, wherein the array substrate defines a display area and a non-display area, the metal wire grid is disposed in the display area, and the metal connection terminal is disposed in the non-display area, the metal wire grid comprises a plurality of electrode patterns distributed in a matrix, and adjacent electrode patterns are separated by a partition area, the force touch display device further comprises a color film substrate; the array substrate and the color film substrate are oppositely disposed; the color film substrate comprises a second carrier substrate and a plurality of color film layers and black matrix units distributed at a distance with each other on the second carrier substrate; and a projection of the metal wire grid falls within a projection of the plurality of color film layers; and a projection of the partition area falls within a projection of the black matrix units; and
a light guide plate disposed between the array substrate and the metal reflective plate.

2. The force touch display device according to claim 1, wherein the metal connection terminal is electrically connected to the metal reflective plate through a conductive tape.

3. The force touch display device according to claim 1, wherein both the metal wire grid and the metal connection terminal are disposed on a surface of the first carrier substrate facing away from the light guide plate.

4. The force touch display device according to claim 1, wherein the metal wire grid is an integral pattern.

5. The force touch display device according to claim 4, wherein the array substrate further comprises a touch driving circuit; the touch driving circuit is disposed in a non-display area, and the touch driving circuit is electrically connected to the metal connection terminal;
wherein the metal connection terminal is connected to a ground terminal or a DC signal terminal.

6. The force touch display device according to claim 5, wherein the array substrate further comprises a display driving circuit, and the display driving circuit is disposed in the non-display area.

7. The force touch display device according to claim 1, wherein the array substrate further comprises a touch driving circuit; the touch driving circuit is disposed in the non-display area; and the touch driving circuit is electrically connected to the metal connection terminal;
wherein the metal connection terminal is connected to a ground terminal or a DC signal terminal.

8. The force touch display device according to claim 1, wherein the metal wire grid has a thickness range of 100 nm to 200 nm.

9. A method for manufacturing a force touch display device, comprising:
providing a first carrier substrate, forming a metal wire grid, a metal connection terminal, a driving element, and a switching element on the first carrier substrate to obtain an array substrate, in which the metal wire grid comprises a plurality of metal wires arranged in parallel, and the metal wire grid is configured so that light passing through the metal wire grid becomes a linearly polarized light;
providing a second carrier substrate, forming a plurality of color film layers and black matrix units distributed at a distance with each other on the second carrier substrate to obtain a color film substrate;
oppositely disposing the array substrate and the color film substrate to form a display panel, wherein a projection of the metal wire grid falls within a projection of the plurality of color film layers;
attaching a light guide plate and a metal reflective plate to a surface of the array substrate facing away from the metal wire grid and the metal connection terminal, and the light guide plate is disposed between the array substrate and the metal reflective plate; and
electrically connecting the metal reflective plate to the metal connection terminal.

10. The method for manufacturing the force touch display device according to claim 9, wherein
the metal wire grid, the metal connection terminal, the driving element, and the switching element are formed on the first carrier substrate by a first patterning process;
the plurality of the color film layers and the black matrix units that are distributed at the distance with each other are formed on the second carrier substrate by a second patterning process.

11. A method of driving a force touch display device, wherein the force touch display device comprises:
a metal reflective plate;
an array substrate that comprises a first carrier substrate and a metal wire grid and a metal connection terminal disposed on the first carrier substrate, in which the metal connection terminal is electrically connected to the metal reflective plate; and the metal wire grid comprises a plurality of metal wires arranged in parallel, and the metal wire grid is configured so that light passing through the metal wire grid becomes linearly polarized light, wherein the array substrate defines a display area and a non-display area, the metal wire grid is disposed in the display area, and the metal connection terminal is disposed in the non-display area, the metal wire grid comprises a plurality of electrode patterns distributed in a matrix, and adjacent electrode patterns are separated by a partition area, the force touch display device further comprises a color film substrate; the array substrate and the color film substrate are oppositely disposed; the color film substrate comprises a second carrier substrate and a plurality of color film layers and black matrix units distributed at a distance with each other on the second carrier substrate; and a projection of the metal wire grid falls within a projection of the plurality of color film layers; and a projection of the partition area falls within a projection of the black matrix units; and
a light guide plate disposed between the array substrate and the metal reflective plate;
wherein, the method for driving the force touch display device comprising:
providing a ground signal or a DC signal to the metal reflective plate; and
when pressure acts on the force touch display device, the pressure is calculated by detecting variations of a capacitance between the metal wire grid and the metal reflective plate.

* * * * *